W. F. VAN CLEAVE & A. T. WOODALL.
DEVICE FOR HOLDING TROLLEY POLES ON WIRES.
APPLICATION FILED OCT. 18, 1909.
1,017,711.  Patented Feb. 20, 1912.
2 SHEETS—SHEET 1.
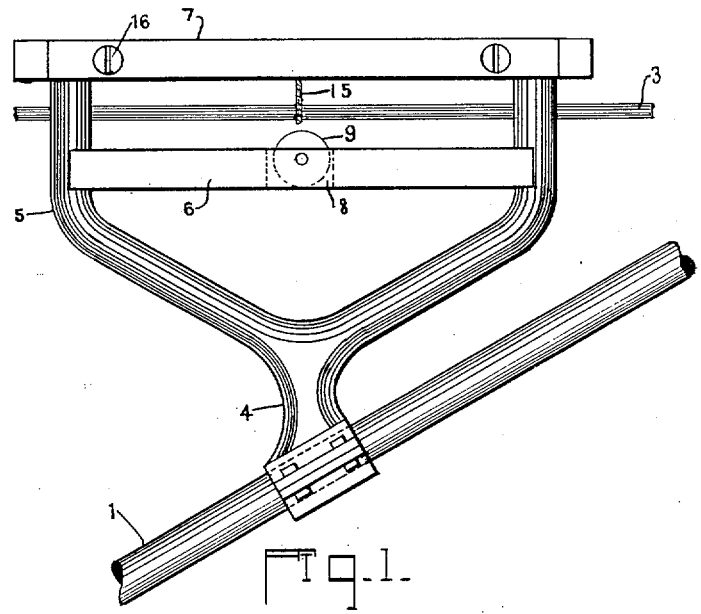
Fig. 1.
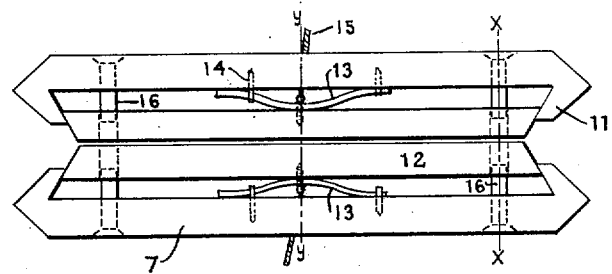
Fig. 2.
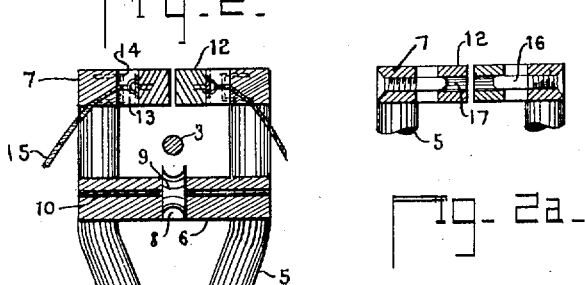
Fig. 2a.
Fig. 3.
WITNESSES:
C. A. Scott
J. S. Murray
INVENTORS
William F. Van Cleave
Anderson T. Woodall
BY John M. Spellman
ATTORNEY

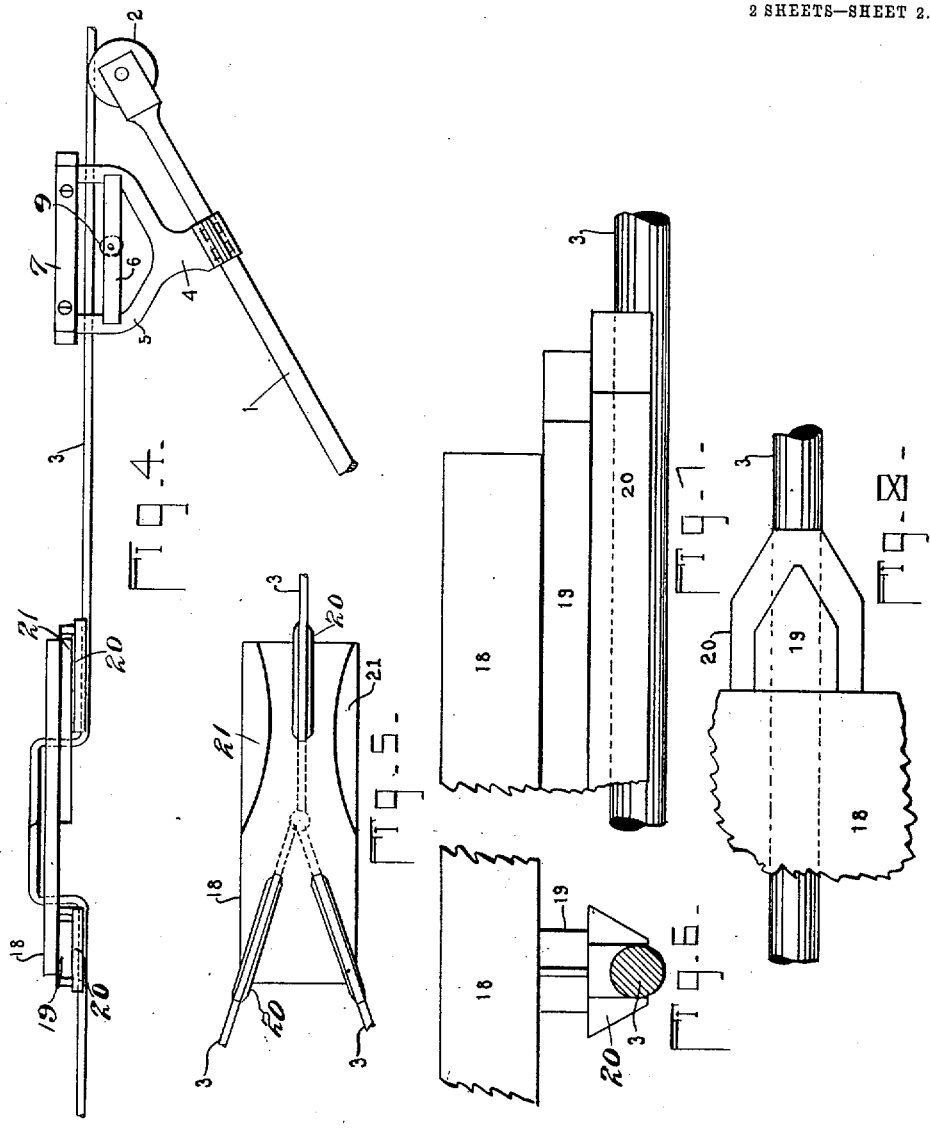

UNITED STATES PATENT OFFICE.

WILLIAM F. VAN CLEAVE AND ANDERSON T. WOODALL, OF DALLAS, TEXAS.

DEVICE FOR HOLDING TROLLEY-POLES ON WIRES.

1,017,711.      Specification of Letters Patent.      Patented Feb. 20, 1912.

Application filed October 18, 1909. Serial No. 523,336.

*To all whom it may concern:*

Be it known that we, WILLIAM F. VAN CLEAVE and ANDERSON T. WOODALL, citizens of the United States, residing at 866 Bryan street, Dallas, in the county of Dallas and State of Texas, have invented certain new and useful Improvements in Devices for Holding Trolley-Poles on Wires, of which the following is a specification.

Our invention relates to new and useful improvements in devices for holding a trolley pole upon its wire. Its object is to provide a device that will hold the trolley wheel in constant contact with the trolley wire, and will eliminate the annoyance and loss of time due to the trolley pole escaping from its wire.

Another object is to provide such a device with means by which it may be manually released when it is desired to remove the trolley pole from contact with the wire.

Finally, the object of the invention is to provide a device of the character described, that will be strong, durable, simple and efficient, and comparatively easy to construct, and also one in which the various parts will not be likely to get out of working order.

With these and various other objects in view, our invention has relation to certain novel features of construction and operation, an example of which is described in the following specification, and illustrated in the accompanying drawing, wherein:

Figure 1 is a side elevation of the device secured to the upper portion of a trolley pole, and inclosing the trolley wire. Fig. 2 is a top view of the same. Fig. 2$^a$ is a cross sectional view on the line $x$—$x$ of Fig. 2. Fig. 3 is a vertical transverse sectional view on the line $y$—$y$ of Fig. 2. Fig. 4 is a view of a portion of a trolley wire, showing side elevations of one of the plates employed where the track forms a Y, and showing the upper portion of a trolley pole adjacent to the tie-plate with the retaining device in position. Fig. 5 is a bottom view of the tie plate. Fig. 6 is an end elevation of one of the brackets which attach the trolley wires to the tie plate. Fig. 7 is a side elevation of a portion of the tie plate and one of said brackets. Fig. 8 is a top view of a portion of the tie plate showing a bracket projecting from beneath the same.

Referring now more particularly to the drawings wherein like numerals of reference designate similar parts in all the figures, the numeral 1 denotes a trolley pole and 2 the trolley wheel mounted on the upper end thereof, and engaging a trolley wire 3. Upon the upper portion of the trolley pole is clamped a frame 4 having four upwardly projecting arms 5. A horizontal platform 6 is supported by the arms 5 at their lower parts, and parallel braces 7 are surmounted upon the arms longitudinally of the frame 4. A slot 8 is provided centrally to the platform 6 to receive a sheave 9 upon a spindle 10 mounted in said platform. This sheave will prevent the trolley wire from coming into contact with the platform 6, and causing undesirable friction. The braces 7 have inwardly projecting lugs 11 upon their extremities, which lugs are adapted to contact with the beveled extremities of longitudinal bars 12, and limit the motion of said bars toward each other. These bars are made to approach each other as near as the lugs 11 will permit, by the action of bow springs 13. One of these springs is positioned between each of the bars 12 and the adjacent brace 7, the center of the spring being attached to the bar and the two extremities being extensibly held to the brace by staples 14. Cords 15 are attached to each of the bars 12 at the point where the spring 13 is fastened thereto. These cords may be extended to within reach of the conductor so that by exerting a pull upon them, he may draw the bars 12 apart, producing a sufficient aperture to permit the passage of the wire, when the trolley pole is drawn down. Pins 16, threaded into the braces 7 at each extremity, project into apertures 17 in the bars 12 and prevent the bars being vertically displaced. The distance between the lugs 11 is sufficiently great to permit them to pass on each side of the supports which uphold the trolley wire without friction. The bars 12 are designed to be thrust apart by contact with said supports, closing again under the action of the springs 13 when each support has been passed.

The numeral 18 denotes a tie plate carrying three trolley wire supports adapted for use in conjunction with the herein described device. These supports consist of a neck portion 19 and a head portion 20 preferably integral with each other and with the tie plate. The extremities of the neck portion are wedge shaped as shown in Fig. 8 so as to readily force the bars 12 to either side.

The curved guides 21 which project from the underside of the tie plate are adapted to contact with the braces 7 when a car is coming off either branch of the Y on to the main line or off the main line on to either branch. Since the distance between the two guides is just sufficient to permit the braces 7 to pass through, the braces are caused to pass on each side of the neck of the main wire support without striking the same.

We are aware that changes may be made in the form and proportion of the parts and details of the device herein described as the preferable embodiment of our invention without departing from the spirit or sacrificing the advantages thereof, and we therefore reserve the right to make such changes and alterations in said device as fairly come within the scope of the following claims.

What we claim is:

1. In a device of the class described, the combination with a trolley pole and trolley wire; of a frame having a sleeve portion bolted to the pole below the wheel thereof, arms projecting upwardly from said frame and having an interior space adapted to receive the trolley wire, spring actuated means mounted in the upper portion of the frame to prevent disengagement of the trolley wheel from the wire and said wire from the interior space, means to limit the upward movement of the frame without friction and means for separating said spring actuated means in a parallel line, to permit upward displacement of the wire.

2. The combination with a trolley pole and trolley wire; of a wheel carried rotatably at the upper end of the pole, a frame attached to the pole below its upper end and spaced from the wheel forwardly, means carried by the frame below the wire to prevent upward movement thereof and reduce the friction thereon, bars mounted in the upper portion of the frame, projections formed on the frame to limit the inward movement of the bars, guides for said bars, means for holding said bars normally together and flexible connections for separating said bars to permit removal of the wire.

3. In a device of the character described, the combination with a trolley pole and trolley wire, of a frame attached to the upper portion of the trolley pole, having an interior space adapted to receive the trolley wire, bars laterally supported upon said frame, having their inner faces parallel to the trolley wire, springs acting on said bars holding them normally adjacent, preventing upward displacement of the trolley wire, means to prevent upward movement of the frame and to reduce friction thereon and a flexible connection to each of said bars by which it may be displaced.

4. In a device of the character described, the combination with a trolley pole and trolley wire, of a frame rigidly fastened upon the upper portion of the trolley pole, having an interior space adapted to receive the trolley wire, a wheel rotatably mounted in said frame adapted to contact with the wire, pins projecting inwardly from the upper portion of said frame, bars slidable upon said pins, springs holding said bars normally adjacent, and cords attached to said bars adapted to separate them, compressing the springs when put under tension.

In testimony whereof we have signed our names to this specification in the presence of two subscribing witnesses.

WILLIAM F. VAN CLEAVE.
ANDERSON T. WOODALL.

Witnesses:
G. B. COULSON,
J. S. MURRAY.

---

Copies of this patent may be obtained for five cents each, by addressing the "Commissioner of Patents, Washington, D. C."